United States Patent Office 3,347,918
Patented Oct. 17, 1967

3,347,918
PRODUCTION OF CYCLODODECYLAMINE
Ludwig Schuster and Paul Raff, Ludwigshafen (Rhine), Germany, assignors to Badische Anilin- & Soda-Fabrik Aktiengesellschaft, Ludwigshafen (Rhine), Germany
No drawing. Filed July 13, 1964, Ser. No. 382,402
Claims priority, application Germany, July 24, 1963, B 72,815
6 Claims. (Cl. 260—563)

ABSTRACT OF THE DISCLOSURE

Production of cyclododecylamine by mixing cyclododecene and hydrogen cyanide in a molar ratio of 1:5 to 1:15 at a temperature of from 0° to 50° C. with sulfuric acid of concentration of 80 to 96% by weight in excess of 3 to 10 mols $H_2SO_4$ with reference to cyclododecene, saponifying the N-cyclododecylformamide intermediately formed and liberating the cyclododecylamine from the cyclododecylamine salt.

This invention relates to the production of cyclododecylamine from cyclododecene by the Ritter reaction, i.e. by the action of hydrogen cyanide and saponification of the intermediately formed formamide.

It is known that formamides which are substituted on nitrogen are obtained by N-alkylation of hydrogen cyanide; these substituted formamides may readily be saponified into the corresponding amines. For the said purpose, hydrocarbons which contain an olefinic double bond are reacted with hydrocyanic acid in the presence of strongly acid condensing agents, preferably sulfuric acid.

A process for the production of N-cyclohexylformamide is known from U.S. Patent No. 2,819,306 according to which 1 mole of cyclohexene is reacted with slightly more than 1 mole of hydrocyanic acid in the presence of 1.5 to 2.5 moles of a sulfuric acid which contains 7 to 13% of water.

A method of carrying out this reaction is described in British patent specification No. 796,572 in which the reaction is carried out in the presence of 55 to 90% aqueous sulfuric acid. The olefin and hydrogen cyanide are preferably used in equimolar amounts and the sulfuric acid in an amount corresponding to 1.5 moles If cyclododecene be reacted under the conditions described in the literature, only very low yields of cyclododecylamine are obtained because the olefin reacts very slowly and incompletely. Also, the amine is strongly contaminated by byproducts.

It is the object of this invention to provide a process for the production of cyclododecylamine from cyclododecene in which cyclododecylamine is obtained in a high yield and in great purity.

We have now found that cyclododecylamine is obtained in very good yields by reaction of cyclododecene with hydrocyanic acid in the presence of about 80 to 96% sulfuric acid and saponification of the N-cyclododecylformamide formed intermediately, by allowing cyclododecene and hydrocyanic acid to act on each other at temperatures between 0° and 50° C., preferably between 10° and 25° C., in the molar ratio of 1:5 to 1:15 in the presence of a 3-molar to 10-molar, preferably a 3-molar to 6-molar, excess of sulfuric acid with reference to cyclododecene, the molar ratio between hydrocyanic acid and sulfuric acid being 1.25 or higher, saponifying the N-cyclododecylformamide formed, separating neutral cyclododecylammonium sulfate and liberating cyclododecylamine therefrom by a conventional method.

It is usually advantageous to carry out the reaction at atmospheric pressure but in certain cases, for example when using an endless tubular mixing vessel, superatmospheric pressure, for example up to 5 atmospheres gage, may be favorable.

It is preferable to place a mixture of sulfuric acid and hydrocyanic acid in a reactor and to add the cyclododecene slowly thereto while providing for intense mixing of the reaction mixture. The reaction may be carried out in a vessel fitted with a stirrer or impeller or in a system operating continuously, for example an endless tubular mixing vessel. After the olefin has been added to the reaction mixture, the reaction mixture is advantageously kept for some hours at about room temperature, if desired while stirring.

Excess hydrocyanic acid is removed from the reaction mixture, for example by distilling it off after the reaction mixture has been diluted with water, for example with from 0.6 to 5.0 liters of water per mole of substituted formamide, the N-cyclododecylformamide being saponified unles saponification has already taken place during the reaction. It may be advantageous, to complete the saponification, to heat the reaction mixture diluted with water under reflux for some time, for example for half to one hour. When the solution is cooled, the cyclododecylamine formed is precipitated as the neutral sulfate.

Some of the N-formyl derivative formed is saponified during the reaction. With certain concentrations of hydrocyanic acid and sulfuric acid, some of the cyclododecylammonium sulfate may be precipitated direct from the reaction mixture. After the N-cyclododecylformamide has been completely saponified, it is recommended that the mixture be cooled to complete the precipitation of the product. Some solubility data are given below from which it may be seen what temperatures and concentrations should be maintained to achieve substantial separation of the cyclododecyl sulfate, i.e. to decrease the solubility below about 0.1 g./l.

SOLUBILITY OF $(C_{12}H_{25}N)_2 \cdot H_2SO_4$

| Solvent | Temperature, °C. | Concentration, g./l. |
|---|---|---|
| Water | +5 | 0.08 |
| 10% sulfuric acid | +5 | 0.07 |
| 20% sulfuric acid | +5 | 0.06 |
| 30% sulfuric acid | +5 | 0.06 |
| 10% sulfuric acid | 0 | 0.05 |
| Do | +5 | 0.07 |
| Do | +10 | 0.1 |
| Do | +20 | 0.3 |
| Do | +30 | 1.05 |
| Do | +50 | 4.1 |

It is advantageous to set up such concentrations after the reaction that the neutral cyclododecylammonium sulfate remains clearly dissolved in the hot acid reaction solution after the excess hydrocyanic acid has been distilled off and is not precipitated until the solution is cooled. This is achieved when the concentration of cyclododecylammonium sulfate in the undiluted or diluted reaction mixture does not exceed about 500 g./l.; advantageously a concentration of 50 to 200 g./l., is maintained.

The deposited crystals are separated, for example by suction filtration or centrifuging, and advantageously washed with cold water. The salt is decomposed by the methods conventionally used for liberating the amine from an amine salt, for example by treatment with more strongly basic substances. The simplest method is to introduce the isolated cyclododecylamine salt with stirring into a 10 to 50% caustic soda solution or caustic potash solution at 50° to 100° C. and to isolate the cyclododecylamine from the mixture by methods such as are known for the separation of amines from alkaline solutions.

The processing of the saponified reaction mixture may however be carried out in manner in which amines are usually isolated from acid solutions containing the same, for example by adding a basic-reacting substance, for example caustic soda solution, caustic potash solution, calcium hydroxide to the sulfuric acid solution of cyclododecylamine until an alkaline reaction occurs, the bulk of the cyclododecylamine thus separating in oily form. A further fraction of cyclododecylamine may be recovered from the alkaline solution by extraction with organic solvents which are not miscible with water and which are inert to amines and acids, for example aromatic or aliphatic hydrocarbons or ethers, e.g., petroleum ether, gasoline fractions, isooctane, benzene, toluene, diethyl ether or dibutyl ether. Ion exchangers having a basic reaction may be used instead of the bases.

Cyclododecylamine obtainable by the process is very pure and solidifies at room temperature. It is a valuable intermediate for the production of pharmaceuticals and plant protection agents.

Examples

The results set out in the following table are obtained by the following method:

A mixture of sulfuric acid and hydrocyanic acid is placed in a flask having a high speed stirrer. Cyclodecene is slowly added with stirring, the specified temperature being maintained by external cooling. A clear solution is formed which is stirred for one to four hours at room temperature. The reaction mixture is then diluted with such an amount of water that a 10 to 30% sulfuric acid is formed. The heat of dilution evolved is advantageously used to distill off a portion of the excess hydrocyanic acid. The remaining hydrocyanic acid is completely distilled off and the solution left behind is heated for another hour so that it boils under reflux. The mixture is then cooled to +5° C. while stirring, the deposited crystals are suction filtered and washed with a little cold water. The separated cyclododecylammonium sulfate is heated to 100° C. with stirring with the amount of 25% caustic soda solution stoichiometrically required for liberation of all the cyclododecylamine, or with a larger amount. The cyclododecylamine sulfate passes into solution and the free cyclododecylamine separates as an oily layer. The whole is cooled, the amine separated and the mother liquor extracted with ether. The separated amine and the ether extracts are combined, dried and the ether distilled off on a waterbath. The cyclododecylamine remaining is distilled at subatmospheric pressure. It boils at 75° to 80° C. at a pressure of 0.01 mm. Hg. The theoretical amine number is 302. The purity of the amine number is 302. The purity of the amine is investigated by gas chromatography. Examples 4 and 5, in which the reaction is carried out outside the claimed ranges, are included for purposes of comparison.

TABLE

| Example No | 1 | 2 | 3 | 4 | 5 |
| --- | --- | --- | --- | --- | --- |
| $H_2SO_4$ concentration in percent | 92.5 | 90 | 92.5 | 96 | 92.5 |
| Molar ratio of— olefin:$H_2SO_4$:HCN | 1:3:6 | 1:4:8 | 1:4:8 | 1:1.5:2 | 1:2:4 |
| Reaction temperature, °C | 10 | 15 | 20 | 20 | 25 |
| Reaction period in minutes | 105 | 90 | 15 | 30 | 90 |
| Amine number | 304 | 302 | 302 | 270 | 294 |
| Purity, percent | 100.0 | 100.0 | 100.0 | 89.4 | 96.6 |
| Yield in percent of the theory | 79.5 | 93.0 | 93.0 | 42.5 | 45.8 |

We claim:
1. A process for the production of cyclododecylamine which comprises mixing cyclododecene and hydrogen cyanide in a molar ratio of from 1:5 to 1:15 at a temperature of from 0° to 50° C. with sulfuric acid of a concentration of 80 to 96% by weight in an excess of 3 to 10 moles with reference to cyclododecene, saponifying the N-cyclododecylformamide intermediately formed and liberating the cyclododecylamine from the cyclododecylamine salt.

2. A process for the production of cyclododecylamine which comprises mixing cyclododecene and hydrogen cyanide in a molar ratio of from 1:5 to 1:15 at a temperature of from 0° to 50° C. with sulfuric acid of a concentration of 80 to 96% by weight in an excess of 3 to 10 moles with reference to cyclododecene, saponifying the N-cyclododecylformamide intermediately formed, precipitating by cooling the cyclododecylamine in the form of the neutral sulfate and liberating the cyclododecylamine from the cyclododecylamine salt.

3. A process as claimed in claim 1 in which the sulfuric acid is used in a molar excess of 3 to 6 moles with reference to cyclododecene.

4. A process as claimed in claim 2 in which the sulfuric acid is used in a molar excess of 3 to 6 moles with reference to cyclododecene.

5. A process as claimed in claim 1 wherein mixing of the cyclododecene, hydrogen cyanide and sulfuric acid is carried out at a temperature of from 10 to 25° C.

6. A process as claimed in claim 2 wherein mixing of the cyclododecene, hydrogen cyanide and sulfuric acid is carried out at a temperature of from 10 to 25° C.

References Cited
UNITED STATES PATENTS 2,632,022   3/1953   Bortnick _____ 260—563

CHARLES B. PARKER, Primary Examiner.

P. C. IVES, N. WICZER, Assistant Examiners.